Patented June 15, 1926.

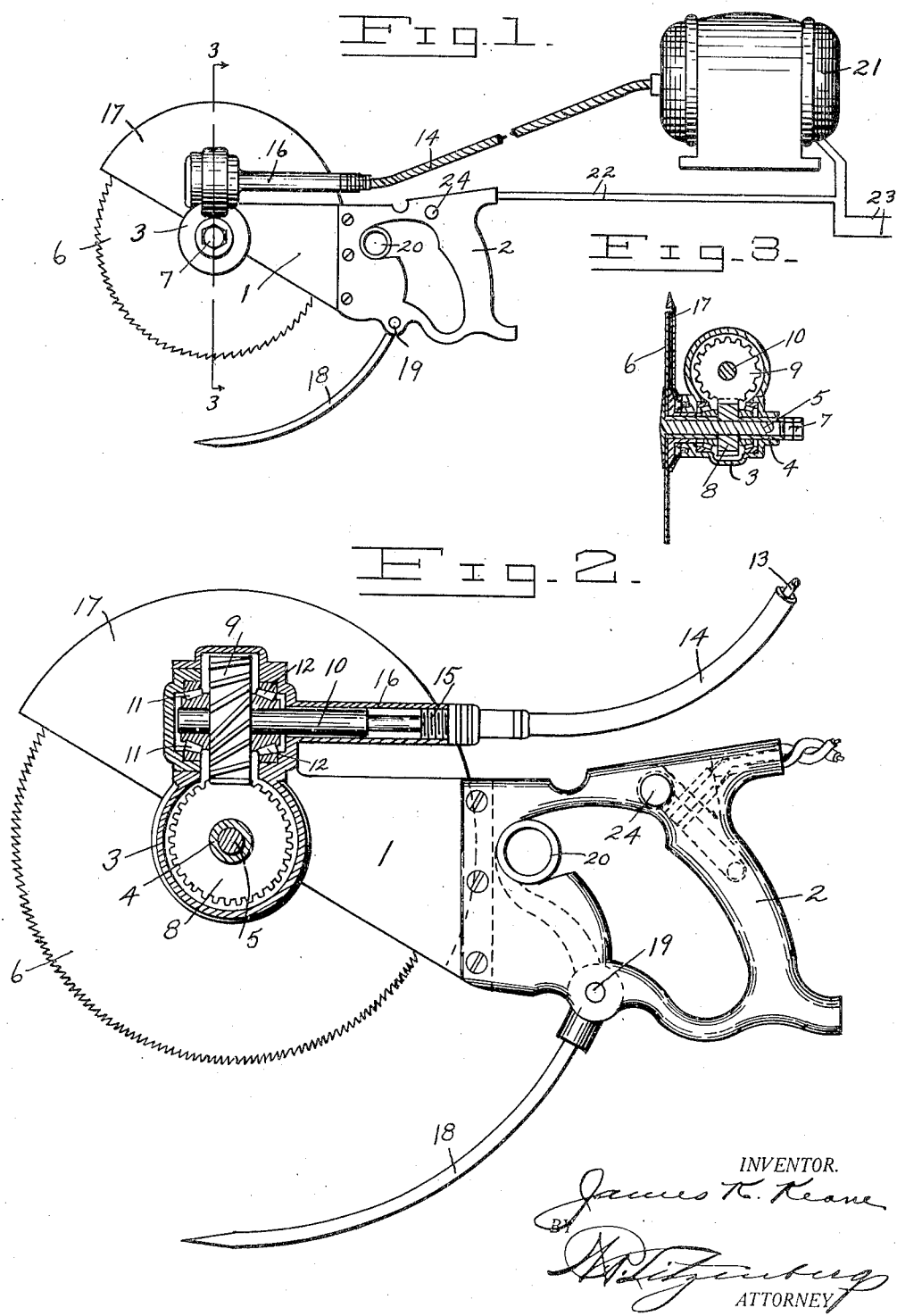

1,588,744

UNITED STATES PATENT OFFICE.

JAMES K. KEANE, OF LOS ANGELES, CALIFORNIA.

HAND POWER SAW.

Application filed September 26, 1924. Serial No. 739,973.

My invention relates to hand power saws adapted to be held in the hand and to be power driven and has special reference to a rotary saw. Among the salient objects of my invention is to provide a rotary, power-driven saw blade, with handle and adapted to be held in the hand and moved from place to place and adjusted to the work, with means for driving the saw; to provide suitable guard means for the saw, with simple control for the power which drives the saw, whereby the saw can be started and stopped by a simple manipulation of the controlling element; to provide in combination with a hand saw, a movable feed element, also arranged to be conveniently manipulated by the hand or finger for gradually moving the work and saw together in the cutting operation, and, in general, to provide in such a combination a simple, practical and compact and conveniently operated hand power saw.

In order to describe my invention, I have illustrated one practical embodiment thereof on the accompanying sheet of drawings, which I will describe in detail. In the drawings,—

Figure 1 is a side elevation of a power saw embodying my invention, showing an electric motor as the power furnishing means;

Figure 2 is a similar view, partly in section to show the drive connections to the saw, and indicating the control switch in the handle; and Figure 3 is a sectional view axially of the power saw.

Referring now in detail to the drawings, the embodiment of my invention shown for descriptive purposes comprises a body plate or member, 1, with handle, 2, and housing 3. Mounted in said housing is a bearing sleeve, 4, through which is a shaft or axle, 5, having mounted on one end, a circular saw, 6, and at its other end provided with nuts, 7, by means of which said saw, shaft and bearing sleeve 4 are clamped together. On the sleeve 4, within the housing, 3, is a spiral gear, 8, for driving said sleeve, shaft and saw. In the upper part of the housing, is mounted a second spiral gear, 9, which is in mesh with the spiral gear, 8, as shown in Fig. 2, said gear 9, being mounted on a shaft 10, with roller bearings, 11 and 12, at opposite sides of the gear 9, as shown, whereby said gear 9, drives gear 8, and the saw. A flexible shaft, 13, in a tubing, 14, is connected to the gear shaft 10, as at 15, with a sleeve, 16. A guard, 17, is placed over the saw, 6, as shown, said guard being open at one side, whereby to permit of the easy removal of said saw for cleaning purposes. In order to remove said saw, it is only necessary to remove the nuts, 7, whereupon the shaft, 5, can be removed from the sleeve, 4, the saw and shaft being removed together. This does not disturb the bearing sleeve, 4, and its roller bearings, and the saw and shaft can again be inserted into place and the nuts 7, replaced, and the saw is ready for use.

Pivotally mounted in the handle 2, is a feed prong or element, 18, pivoted in the handle at 19, with a finger piece, 20, positioned in the handle, as clearly shown, whereby one of the fingers will enter the finger piece, 20, and move the same in order to move the feed prong 18, toward the work, or to force the work toward the saw in the operation of said saw. If the saw is used for cutting the bone in meat, it will be clear that the prong 18, can be thrust into the meat to assist in holding it and in forcing the saw through the bone by pulling the finger piece, 20, rearwardly in the handle.

In the drawings, a motor, 21, is shown for furnishing the driving power for the saw, with circuits, 22, 23, connected through the handle, to a controlling switch, 24, within easy reach of the thumb of the hand which grips the handle 2, as will be clear from Fig. 2.

Thus in a compact and practical manner I have provided a hand power saw with simple control and with means for feeding the saw and the work together. The device is particularly designed for cutting meat, but I do not limit it to this use, realizing that it can be readily adapted for many different uses, and I do not limit the invention to the showing made, except as I may be limited to the hereto appended claims.

I claim:

1. A hand power saw, including a body with handle for manual support and manipulation, a circular saw revolubly mounted in said body, driving means for driving said saw, said driving means being operable by a driving shaft, and a feed element movably connected to said device and operable by hand for moving the work toward the saw.

2. A hand power saw comprising in combination, a body with handle, a saw, driving means for said saw, controlling means in said handle for controlling the operation of said saw at will, and a feed member movably connected to said device and operable by hand for moving the work toward the saw.

3. A hand power saw of the character referred to and comprising in combination, a body having a handle and a housing at opposite ends thereof, supporting and driving means for a circular saw in said housing, a circular saw supported and operated thereby, means for connecting a source of power to said driving means, a guard over part of said saw, means in the handle for controlling the application of power to said saw, and a feed member movably connected to said device and operable by hand for forcing work toward said saw, substantially as described.

4. A hand power saw including in combination, a body member with handle, a housing, gear driving means in said housing, a circular saw supported and connected to be driven by said gear driving means, means for connecting a source of power to said driving means, means in the handle for controlling the application of said power at will, a guard over said saw, a feed member forming a part of said device and manually operable for moving work toward said saw, substantially as described.

5. In a device of the character referred to, a body with handle, a driving sleeve, means for driving the same, a circular saw, a shaft connecting said saw to said sleeve, said saw and shaft being detachable from said sleeve, means for connecting a source of power for driving said driving sleeve, means for controlling the application of power at will to said driving sleeve, and a manually operable feed member forming a part of said device and operable by the finger for moving the work toward the saw, substantially as described.

Signed at Los Angeles, Los Angeles County, California, this 18th day of September, 1924.

JAMES K. KEANE.